US008861430B2

(12) United States Patent
Liao et al.

(10) Patent No.: US 8,861,430 B2
(45) Date of Patent: Oct. 14, 2014

(54) METHODS OF POINT ASSOCIATION FOR COOPERATIVE MULTIPLE POINT TRANSMISSION

(75) Inventors: Pei-Kai Liao, Nantou County (TW); Chih-Yuan Lin, Yilan County (TW)

(73) Assignee: Mediatek Inc. (TW)

( * ) Notice: Subject to any disclaimer, the term of this patent is extended or adjusted under 35 U.S.C. 154(b) by 88 days.

(21) Appl. No.: 13/570,717

(22) Filed: Aug. 9, 2012

(65) Prior Publication Data

US 2013/0039199 A1 Feb. 14, 2013

Related U.S. Application Data

(60) Provisional application No. 61/522,575, filed on Aug. 11, 2011.

(51) Int. Cl.
| H04B 7/185 | (2006.01) |
| H04B 7/06 | (2006.01) |
| H04W 72/08 | (2009.01) |
| H04B 7/02 | (2006.01) |
| H04W 24/10 | (2009.01) |

(52) U.S. Cl.
CPC ............ *H04W 72/085* (2013.01); *H04W 24/10* (2013.01); *H04B 7/0626* (2013.01); *H04B 7/024* (2013.01)
USPC .......................................... 370/318; 370/334

(58) Field of Classification Search
CPC ..... H04W 72/04; H04W 88/08; H04W 76/00; H04W 52/40; H04B 7/0617; H04B 7/04
USPC .................. 370/329, 252, 330, 334, 318, 319
See application file for complete search history.

(56) References Cited

U.S. PATENT DOCUMENTS

| 2010/0271985 | A1* | 10/2010 | Gabriel et al. ................ 370/278 |
| 2011/0237270 | A1 | 9/2011 | Noh et al. ...................... 455/450 |
| 2012/0076040 | A1 | 3/2012 | Hoshino et al. ............... 370/252 |
| 2012/0213261 | A1* | 8/2012 | Sayana et al. ................. 375/224 |

FOREIGN PATENT DOCUMENTS

| CN | 101997658 | 3/2011 |
| WO | WO2010064842 A2 | 6/2010 |
| WO | WO2010140298 A1 | 12/2010 |
| WO | WO2010149038 | 12/2010 |

OTHER PUBLICATIONS

International Search Report and Written Opinion of International Search Authority for PCT/CN2012/079970 dated Nov. 15, 2012 (10 pages).

* cited by examiner

*Primary Examiner* — Dady Chery
(74) *Attorney, Agent, or Firm* — Zheng Jin; Helen Mao

(57) ABSTRACT

Procedures for point association as well as measurement and feedback required to enable point association for CoMP deployment scenario 4 are proposed. In a first novel aspect, a serving eNB configures a first higher-layer configuration for RSRP measurement to be used by a UE for serving point selection. The higher-layer configuration contains multiple CSI-RS configurations, and each CSI-RS configuration indicates a set of resource elements (REs) or subcarriers in both frequency domain and time domain as one CSI-RS resource with non-zero transmission power. The UE then performs RSRP measurements based on the multiple CSI-RS configurations and reports RSRP measurement results to the serving eNB. In a second novel aspect, the serving eNB configures a second higher-layer configuration for CSI reporting based on the reported RSRP measurement results. In a third novel aspect, the serving eNB sends CSI-RS information to the UE for uplink power control.

20 Claims, 5 Drawing Sheets

METHODS OF POINT ASSOCIATION FOR COOPERATIVE MULTIPLE POINT TRANSMISSION

CROSS REFERENCE TO RELATED APPLICATIONS

This application claims priority under 35 U.S.C. §119 from U.S. Provisional Application No. 61/522,575, entitled "Methods of Point Association for Cooperative Multiple Point Transmission," filed on Aug. 11, 2011, the subject matter of which is incorporated herein by reference.

TECHNICAL FIELD

The disclosed embodiments relate generally to CoMP (cooperative multiple points), and, more particularly, to CSI-RS based methods of both downlink and uplink point association for CoMP transmission.

BACKGROUND

LTE-Advanced (LTE-A) system improves spectrum efficiency by utilizing a diverse set of base stations deployed in a heterogeneous network topology. Using a mixture of macro, pico, femto and relay base stations, heterogeneous networks enable flexible and low-cost deployments and provide a uniform broadband user experience. In a heterogeneous network, smarter resource coordination among base stations, better base station selection strategies and more advance techniques for efficient interference management can provide substantial gains in throughput and user experience as compared to a conventional homogeneous network.

The technology, coordinated multiple points (CoMP), also known as multi-BS/site MIMO, is used to enhance the performance of cell-edge UEs in LTE-Advanced systems. In LTE Rel-11, various deployment scenarios for CoMP transmission and reception are introduced. Among the different CoMP scenarios, CoMP scenario 4 refers to Single Cell ID CoMP in heterogeneous network with low-power remote radio heads (RRH). In CoMP scenario 4, low-power RRHs are deployed within macrocell coverage provided by macro-eNB. Because cell IDs for macro-eNB and RRHs inside the coverage of macrocell are the same, UEs are not able to reuse frequency resources. As a result, system throughput degrades in CoMP scenario 4 as compared to CoMP scenario 3, where lower power nodes within macrocell coverage have different cell IDs from each other.

In CoMP technology, a point is defined as a set of geographically co-located transmit/receiving antennas (e.g., a macro-eNB or a RRH). In order to enable frequency reuse inside the coverage of macrocell for CoMP scenario 4, UE-specific MIMO precoding is one possible way but it requires accurate channel state information (CSI) for each connection between each point and UE. In order to obtain accurate CSI, the association between points and measurement/feedback is necessary so that UE can utilize the CSI to reuse the frequency resources without interference from/to other points. There are potential issues for point association in CoMP scenario 4. Procedures for point association as well as measurement and feedback required to enable point association are sought.

SUMMARY

Procedures for point association as well as measurement and feedback required to enable point association for CoMP deployment scenario 4 are discussed and related methods are proposed.

In a first novel aspect, a serving eNB configures a first higher-layer configuration for RSRP measurement to be used by a UE for serving point selection. The first higher-layer configuration contains a first number of CSI-RS configurations, and each CSI-RS configuration indicates a set of resource elements (REs) or subcarriers in both frequency domain and time domain as one CSI-RS resource with non-zero transmission power. The UE then performs RSRP measurements based on the configured first number of CSI-RS resources and reports RSRP measurement results to the serving eNB.

In a second novel aspect, the serving eNB configures a second higher-layer configuration for CSI reporting based on the reported RSRP measurement results. The second higher-layer configuration contains a second number of multiple CSI-RS configurations, which can be a subset of the first number of CSI-RS configurations. UE measurement burden and feedback overhead is reduced with the first and second higher-layer CSI-RS configurations.

In a third novel aspect, the serving eNB sends CSI-RS configuration information to the UE for uplink power control. In one embodiment, the eNB sends a transmit power control (TPC) command, which includes a CSI-RS configuration index or port to the UE for PL (path loss) estimation. In another embodiment, the eNB sends an RRC signaling message, which includes a CSI-RS configuration index or port to the UE for PL estimation. The UE estimates the downlink pathloss based on the corresponding CSI-RS resource associated with the received CSI-RS configuration index or CSI-RS port. The UE then uses the estimated downlink pathloss for uplink power control.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
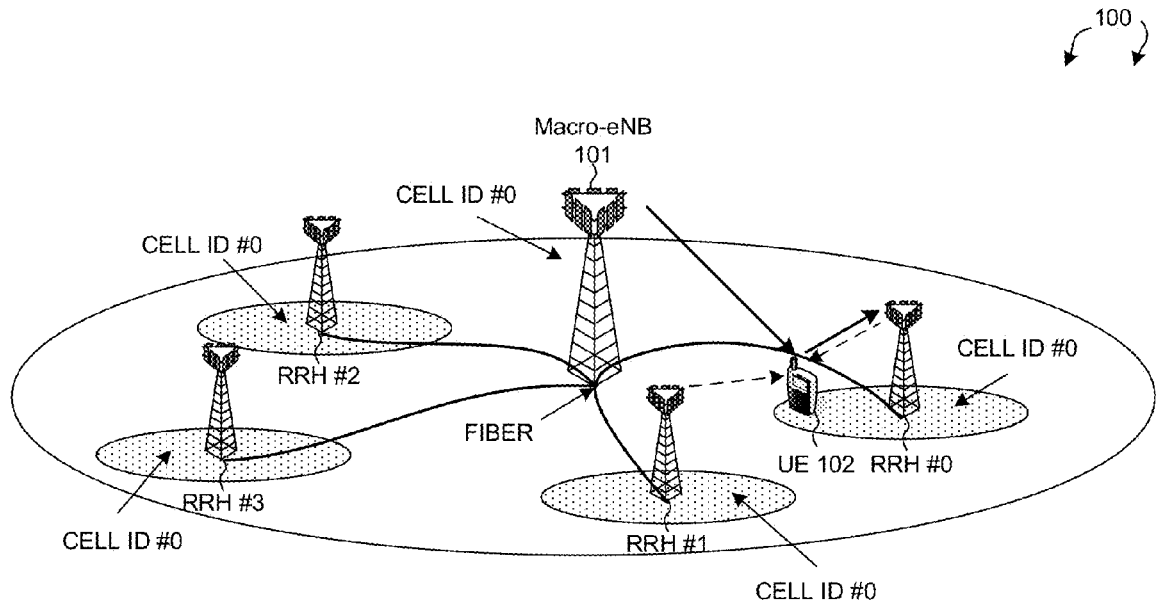
FIG. 1 illustrates a mobile communication network with CoMP deployment scenario 4 in accordance with one novel aspect.

FIG. 1 illustrates a mobile communication network 100 with CoMP deployment scenario 4 in accordance with one novel aspect. Mobile communication network 100 comprises a macro eNB 101, a plurality of remote radio heads RRH#0-#3, and a user equipment UE 102. FIG. 1 illustrates an example of coordinated multiple points (CoMP) deployment scenario 4 in LTE Rel-11 networks. In CoMP deployment scenario 4, the low-power RRHs are located within the macrocell coverage provided by macro-eNB 101, where the downlink transmission and the uplink receiving points created by the RRHs have the same cell ID as the macrocell (e.g., CELL ID#0). To enable frequency reuse inside the coverage of macrocell for CoMP deployment scenario 4, UE-specific multiple-input multiple-output (MIMO) precoding technique is used.

UE-specific MIMO precoding requires accurate channel state information (CSI) feedback for each connection between each point and a UE. In order to obtain accurate CSI, the association between the points and the CSI measurement/feedback is necessary so that UE can utilize the CSI to reuse the frequency resources of its serving point(s) with minimized interference from/to other points. There are several issues for point association in CoMP deployment scenario 4. First, what measurement configuration does the UE need for serving point selection? Second, how does the UE know which CSI measurement configuration to measure on for CSI feedback of downlink control signaling and downlink data transmission point(s)? Third, if downlink control signaling point(s) are different from uplink receiving point(s), how does the UE estimate uplink pathloss (PL) in power control equation?

Note that, in CoMP technology, a point is defined as a set of geographically co-located transmit/receiving antennas (e.g., a macro-eNB or a RRH). Serving point(s) is defined as the point or set of points that participate in CoMP operation for either downlink transmission or uplink receiving. Downlink control signaling point(s) is the point or set of points from which the UE receives specific control signaling. Downlink data transmission point(s) is the point or set of points from which the UE receives UE-specific data. Uplink receiving point(s) is the point or set of points to which the UE transmits UE-specific feedback or data.

Figure 2:
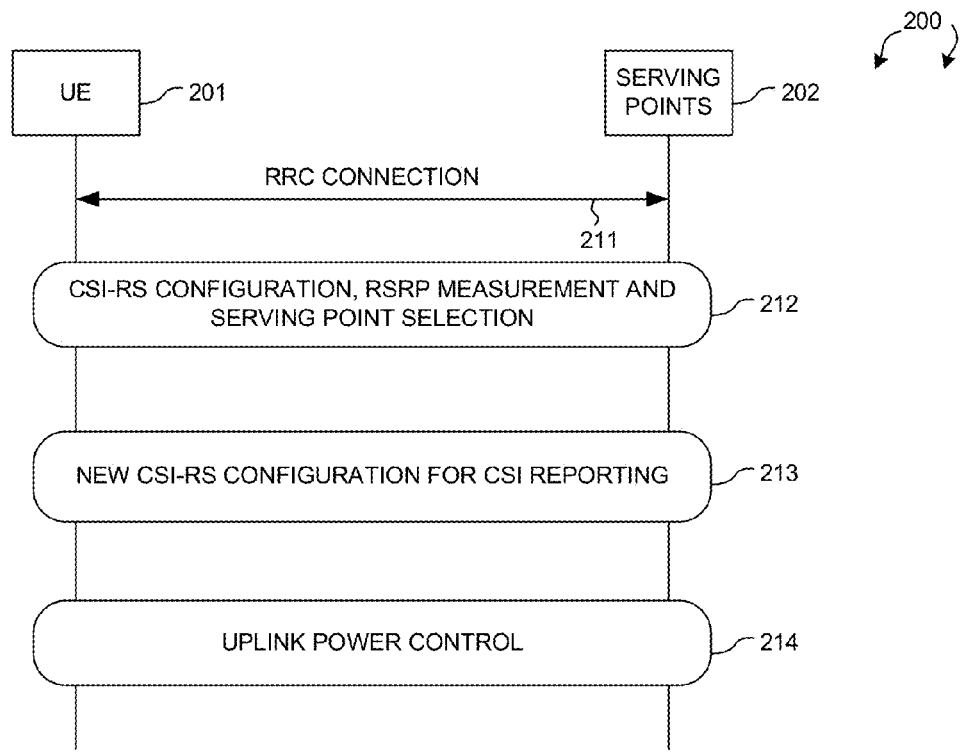
FIG. 2 illustrates novel aspects of point association for cooperative multiple point transmission.

FIG. 2 illustrates three novel aspects of point association for cooperative multiple point transmission in mobile communication network 200. UE 201 establishes a radio resource control (RRC) connection with a serving base station (step 211). With CoMP technology, UE 201 may communicate with one or more serving points 202. In a first novel aspect, multiple CSI-RS configurations with non-zero transmission power are configured for the UE to perform measurements for serving point selection, and the reference signal received power (RSRP) of the configured CSI reference signals are measured for serving point selection (step 212). In a second novel aspect, based on serving point selection, new CSI-RS configurations with non-zero transmission power are configured for the UE to perform channel estimation and CSI reporting (step 213). In a third novel aspect, downlink control signaling point(s) send UE the CSI-RS configuration index or CSI-RS port which UE can utilize for uplink PL estimation.

Figure 3:
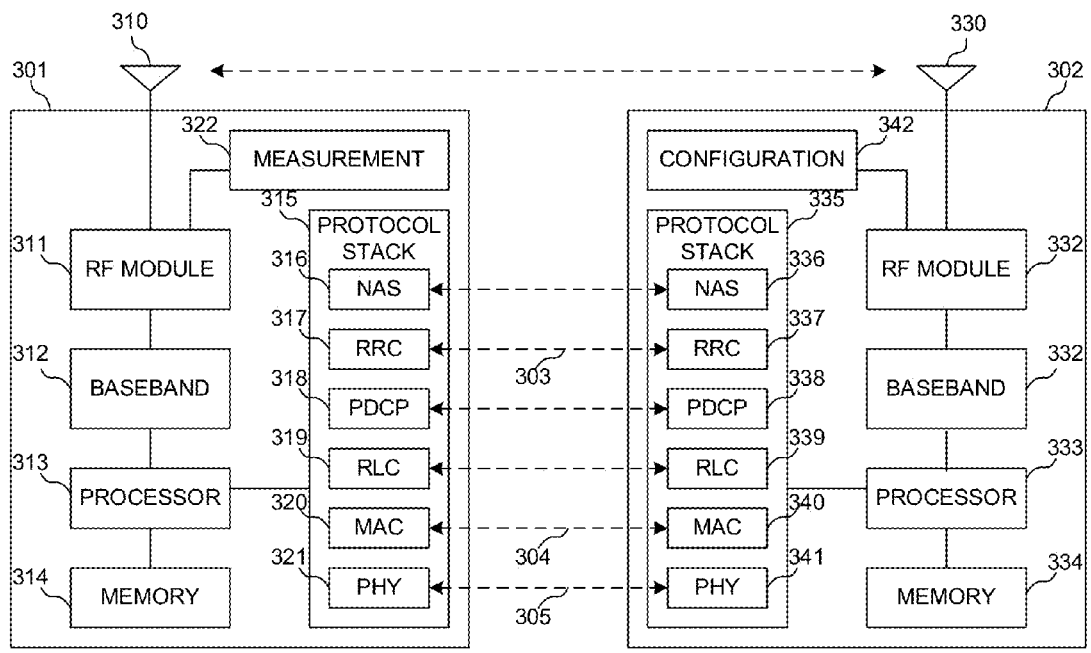
FIG. 3 is a simplified block diagram of a UE and an eNB in accordance with one novel aspect.

FIG. 3 is a simplified block diagram of a UE 301 and an eNB 302 in accordance with one novel aspect. UE 301 and eNB 302 may operate following any communication protocol. For illustrative purposes, the disclosed embodiment operates according to the LTE protocol. UE 301 comprises a transceiver antenna 310 coupled to RF Module 311. Transceiver antenna 310 receives or transmits RF signals. Although only one antenna is shown for UE 301, it is known to the skilled in the art that wireless terminals may have multiple antennas for transmission and reception. RF Module 311 receives signals from either transceiver antenna 310 or baseband module 312, and converts the received signals to baseband frequency. The baseband module 312 processes the signals transmitted from or received by UE 301. Such processing includes, for example, modulation/demodulation, channel coding/decoding, and source coding/decoding. UE 301 further comprises processor 313 that processes digital signals and provides other control functionalities. Memory 314 stores program instructions and data to control the operations of UE 301. Similarly, eNB 302 comprises a transceiver antenna 330 coupled to RF module 331, a baseband module 332, a processor 333, and memory 334.

UE 301 communicates with eNB 302 via a commonly defined layered protocol stacks 315. The layered protocol stack 315 includes Non Access Stratum (NAS) layer 316, which is the protocol between an UE and a mobility management entity (MME) to provide upper layer network control, Radio Resource Control (RRC) layer 317, Packet Data Convergence Control (PDCP) layer 318, Radio Link Control (RLC) layer 319, Media Access Control (MAC) layer 320, and Physical Layer (PHY) 321. The different modules and protocol layer modules may be function modules or logical entities, and may be implemented by software, firmware, hardware, or any combination thereof. The different modules work together, when executed by the processor, allow UE 301 and eNB 302 to perform various communication activities.

More specifically, UE 301 comprises a measurement module 322 that performs measurements, configured by eNB 302 via a configuration module 342. The measurement module 322 usually includes PHY layer functionalities, and the configuration module 342 usually includes RRC layer functionalities. There are different kinds of measurements for UE to perform over different types of reference signals. For mobility management, cell-specific reference signals (CRS) are used by UE to measure the signal strength and/or quality of a cell. For example, Reference signal received power (RSRP) level of the serving cell and neighbor cells are measured by UE to determine the signal quality of each cell. RSRP measurements of the signal strength of a cell-specific reference signal therefore can help to rank between the different cells as input for mobility management (e.g., making handover decisions). Typically, a CRS is cell-specific because it is bundled with the physical cell ID of each cell by the PHY layer.

In CoMP deployment scenario 4, in addition to CRS, CSI-RS is used for serving point selection to achieve cell-splitting gain and higher system throughput via frequency reuse. CSI-RS are new reference signals defined in LTE-Advanced for both RSRP and CSI measurements including rank indicator (RI), channel quality indicator (CQI), and precoding matrix indicator (PMI). Unlike CRS, CSI-RS can be UE-specific and not bundled with the physical cell ID of each cell. Furthermore, CSI-RS is specified by the higher layer (e.g., RRC layer) for supporting up to eight antennas. Better measurement accuracy can be achieved by CSI-RS measurements for serving point selection as well as CSI feedback reporting.

Figure 4:
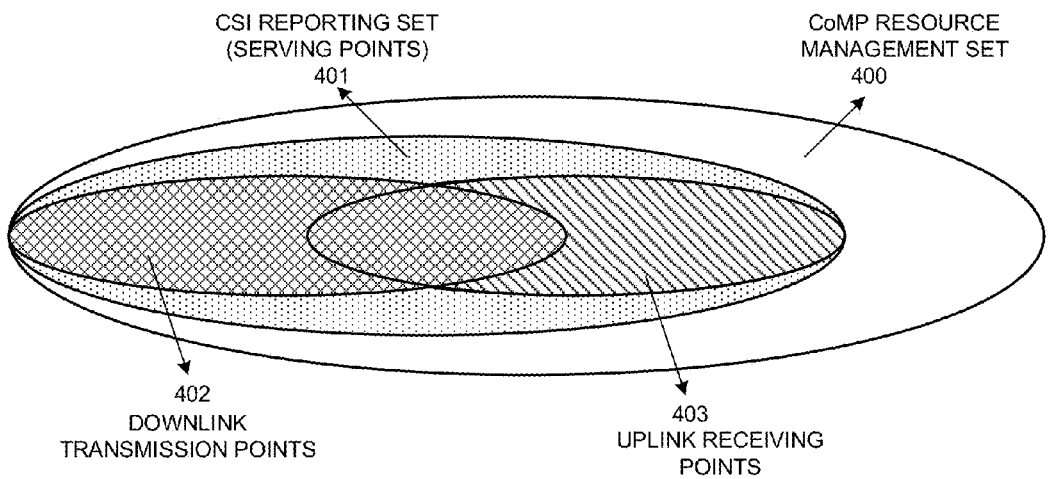
FIG. 4 illustrates serving point selection and CSI reporting in a CoMP resource management set.

FIG. 4 illustrates an example of serving point selection and CSI feedback reporting in a CoMP resource management set 400 of an LTE-Advanced network. In order for a UE to measure different CSI-RS transmitted from different points for serving point selection and for CSI feedback reporting, the measurement configurations for CSI-RS resources need to be configured for the UE. In the example of FIG. 4, a set of CSI-RS configurations, which at least includes the configuration for downlink control signaling point, is defined as the CoMP resource management set 400. CoMP resource management set 400 is configured for UE for serving point selection via RSRP measurements. The process of serving point selection is to identify one or more serving points from the CoMP resource management set that serves a specific UE. The identified serving points are also referred to as the CSI reporting set 401. The CSI reporting set 401 is a subset of the CoMP resource management set 400. CSI reporting set 401 is configured for UE for CSI feedback reporting. By providing different CSI-RS configurations, UE measurement burden and feedback overhead is reduced.

Within the CSI reporting set (serving points) 401, some of the points are downlink transmission point(s) including downlink control signaling point(s) and downlink data transmission point(s), and some of the points are uplink receiving point(s). Both downlink transmission point(s) 402 and uplink receiving point(s) 403 are subsets of CSI reporting set 401. In some scenarios, the downlink transmission point(s) and the uplink receiving point(s) are the same point. In some other scenarios, however, the downlink transmission point(s) and the uplink receiving point(s) are different points.

Figures 5, 6:
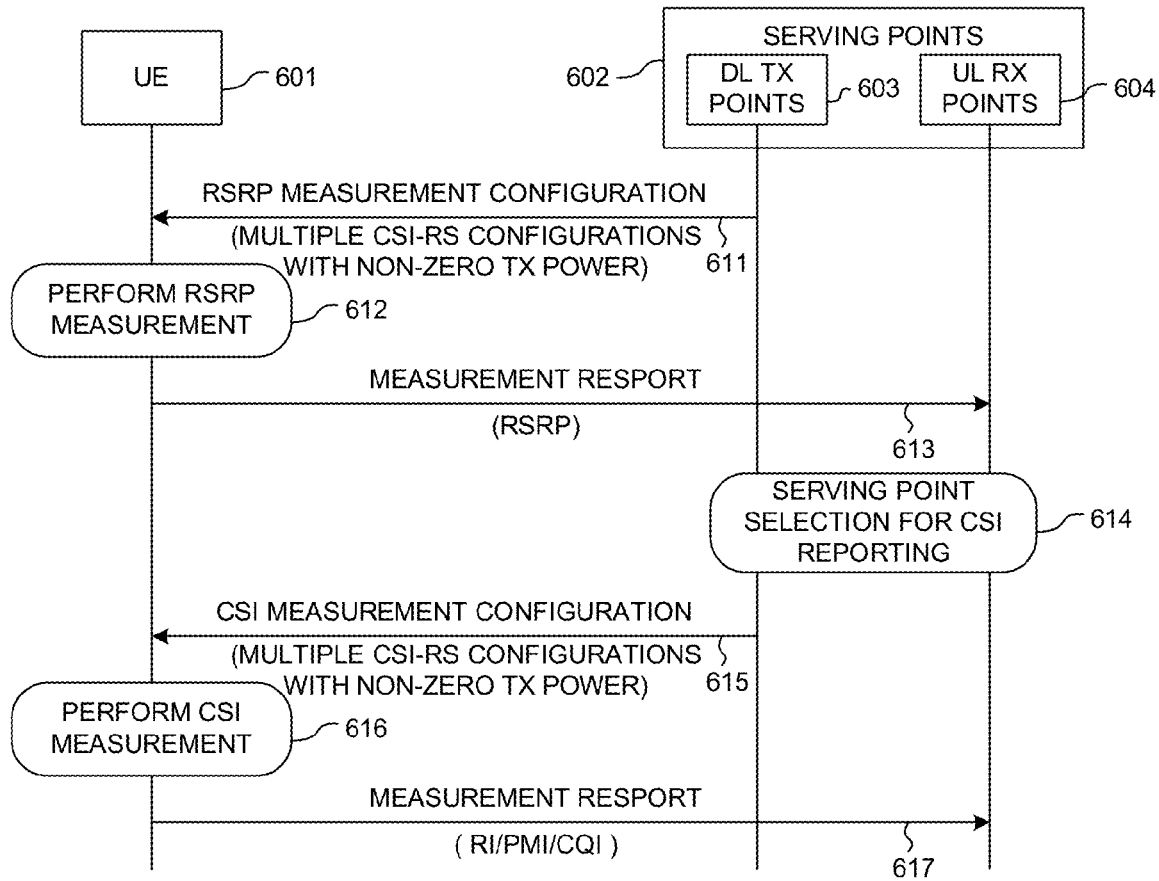
FIG. 5 illustrates one example of predefined CSI-RS configuration indexes and corresponding CSI-RS configurations.
FIG. 6 illustrates one embodiment of measurement configuration for serving point selection and CSI reporting in CoMP deployment scenario 4.

FIG. 5 illustrates one example of CSI-RS configuration indexes and corresponding CSI-RS resource configurations. When eNB sends CSI-RS configuration signaling to UE, the signaling includes 1) Single CSI-RS configuration index with non-zero transmission power, and corresponding antenna port count/transmission power/time location, and 2) Multiple 4-port CSI-RS configuration indices with zero transmission power, and corresponding time location and the scrambling code sequence over reference signals is determined by physical cell ID in Release 10. In Release 11, there will be multiple CSI-RS configuration indices with non-zero transmission power and the corresponding antenna port will be signaled by RRC configuration as well.

In the example of FIG. 5, a table 500 is defined for a plurality of CSI-RS configurations for X antenna ports, where X can be 1, 2, 4, or 8. Each CSI-RS configuration has a CSI-RS configuration index, which indicates a set of resource elements (REs) or subcarriers in both frequency domain and time domain associated with the corresponding CSI-RS, referred to as one CSI-RS resource. For example, CSI-RS configuration index 0 indicates to a set of REs or subcarriers in a PRB-pair (physical resource block pair) of a subframe, and CSI-RS configuration index 1 indicates to another set of REs or subcarriers in a PRB-pair (physical resource block pair) of a subframe, and so on so forth. Based on the CSI-RS configuration indexes, the UE is able to perform measurements for the corresponding CSI-RS resources. Note that some of the CSI-RS configurations are with zero transmission power, mainly used by the UE for rate matching. On the other hand, for measurement purpose, CSI-RS configurations with non-zero transmission power are used.

FIG. 6 illustrates one embodiment of measurement configuration for serving point selection and CSI reporting in CoMP deployment scenario 4. In mobile communication network 600, UE 601 establishes an RRC connection with a serving base station. With CoMP technology, UE 601 may communicate with one or more serving points 602. Serving points 602 include at least one downlink transmission point 603 and at least one uplink receiving point 604. In step 611, the serving base station configures UE 601 by higher layer (e.g., RRC layer) measurement configuration through downlink transmission point 603. The higher-layer configuration is a measurement configuration used by UE 601 for serving point selection. More specifically, the higher-layer configuration contains multiple Channel State Information Reference Signal (CSI-RS) configurations with non-zero transmission power, and each CSI-RS configuration indicates a set of resource elements (REs) or subcarriers in both frequency domain and time domain as one CSI-RS resource with non-zero transmission power. For example, the multiple CSI-RS configurations are configured by the serving base station via RRC signaling. Each configured CSI-RS resource is used by one or more corresponding points for transmitting CSI-RS accordingly.

Upon receiving the multiple CSI-RS configurations, UE 601 performs RSRP measurements over the multiple configured CSI-RS resources (step 612). In one embodiment, an index is used to indicate the CSI-RS configuration used by macro-eNB. For example, a CSI-RS configuration index in table 500 of FIG. 5 is transmitted to UE 601 along with the CSI-RS configurations. In another embodiment, one of the multiple CSI-RS configurations with the assumption of non-zero transmission power is used by macro-eNB by default. For example, the first CSI-RS configuration with the assumption of non-zero transmission power is used by macro-eNB. The reason for informing UE 601 the specific CSI-RS configuration used by macro-eNB is to apply point association bias for range extension. Without knowing which CSI-RS configuration is used by macro-eNB, it is impossible for UE 601 to know which RSRP measurements to apply point association bias.

Point association bias is a technique for range extension of RRH in CoMP deployment scenario 4. Typically, RRH has much lower transmission power as compared to macro-eNB. To extend the coverage for RRH, a quantized bias value is applied to the RSRP measurement result for RRH. For example, a bias value of 5 may be signaled to UE via RRC signaling. If the RSRP of macro-eNB is 5 and the RSRP for RRH is 1, then the reported RSRP for RRH after applying the bias is 6. With such point association bias, CoMP deployment scenario 4 can implement range extension to enhance system throughput. Because the value of point association bias does not change in a short time, RRC signaling is appropriate.

In step 613, after applying point association bias, UE 601 reports the RSRP measurement results to current uplink receiving point 604. Each RSRP measurement result is the time average of several measurements on each CSI-RS configuration, and then applied with point association bias. In one example, the measurement reporting is an order list that determines the order of the monitored CSI-RS configurations based on the received signal strength. UE 601 may report all the RSRP measurement results, or report part of the RSRP measurement results having better received signal strength. Based on the reported RSRP measurement results, the serving eNB selects serving points for CSI reporting (step 614). The serving points include both downlink and uplink serving points. For example, the serving eNB selects three points from the CoMP resource management set that have the best RSRP measurement results as the new CSI-RS configurations for CSI reporting. In step 615, the current downlink control signaling point or downlink data transmission point 603 sends the new CSI-RS configurations for CSI reporting and other necessary information to UE 601.

UE 601 only needs to measure CSI over the new CSI-RS configurations with non-zero transmission power from the selected serving points. Other CSI-RS configurations are mainly for rate matching. With CSI-RS configurations for CSI reporting, UE 601 knows which CSI-RS configuration to measure on for the CSI feedback of either downlink control signaling point(s) or downlink data transmission point(s). UE measurement burden and feedback overhead is reduced with the new CSI-RS configurations.

In one embodiment, UE 601 does not know which CSI-RS configurations are for serving points. All or a subset of CSI- RS configurations with non-zero transmission power are for serving points. One or multiple of the serving points is for downlink control signaling point(s). For example, the first K CSI-RS configurations with non-zero transmission power are for downlink control signaling points, where K is an integer. The CSI-RS configurations for the data traffic from downlink data transmission points can be signaled in either downlink scheduler or RRC message for CSI feedback. For example, an indication field in DCIs to determine which CSI-RS configuration is used for downlink data transmission points.

In another embodiment, UE 601 knows which CSI-RS configurations are for serving points. A subset of CSI-RS configurations with non-zero transmission power are for serving points. For example, the first K1 CSI-RS configurations with non-zero transmission power are for serving points, where K1 is a positive integer. One or multiple of the serving points is for downlink control signaling point(s). For example, the first K2 CSI-RS configurations with non-zero transmission power are for downlink control signaling pints, where K2 is a positive integer. UE 601 provides CSI feedback for serving points' CSI-RS configurations.

In step 616, UE 601 performs channel estimation and measures CSI on the new CSI-RS configurations. In step 617, UE 601 reports CSI measurement results to the current uplink receiving point 604. CSI measurement results contain rank indicator (RI), channel quality indicator (CQI), and precoding matrix indicator (PMI) of the selected serving points. Finally, the serving base station can perform UE-specific MIMO precoding based on the CSI feedback reporting.

For uplink transmission, the transmission power is different among different points. Without precise uplink power control, one UE may interfere with other UEs served by other points. In CoMP deployment scenario 4, if the downlink transmission point is different from the uplink receiving point, then UE cannot estimate uplink pathloss because the PL in power control equation comes from downlink pathloss estimation.

Figure 7:
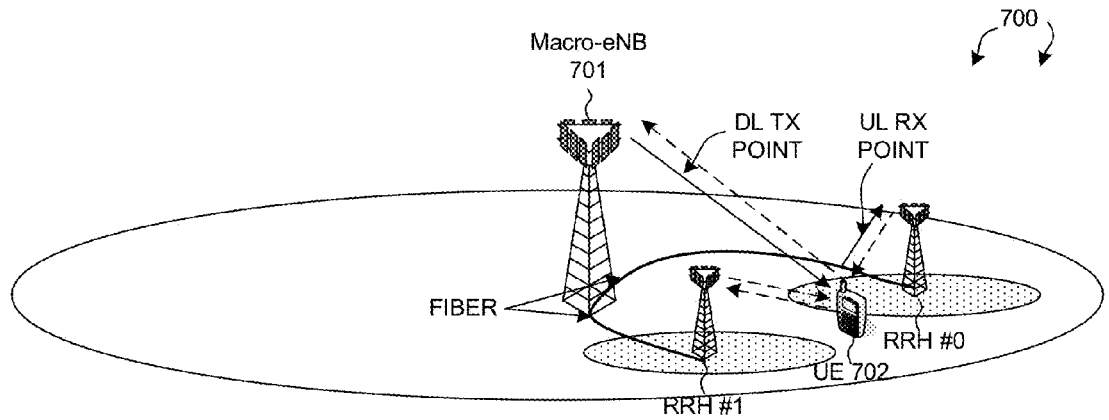
FIG. 7 illustrates one example of downlink control signaling point and uplink receiving point.

FIG. 7 illustrates one example of different downlink control signaling point and uplink receiving point in a mobile communication network 700. Network 700 comprises a macro-eNB 701, a first RRH #0, a second RRH #1, and a UE 702. In the example of FIG. 7, macro-eNB 701 is the downlink transmission point that transmits downlink control signals and data to UE 702. On the other hand, RRH #0 is the uplink receiving point that receives uplink data and feedback from UE 702. Because the downlink transmission point and the uplink receiving point are different, UE 702 cannot estimate uplink pathloss from a different downlink. In one novel aspect, the downlink control signaling point (e.g., macro-eNB 701) sends CSI-RS configuration information to UE 702 so that UE 702 knows which downlink reference signal to estimate for uplink power control.

Figure 8:
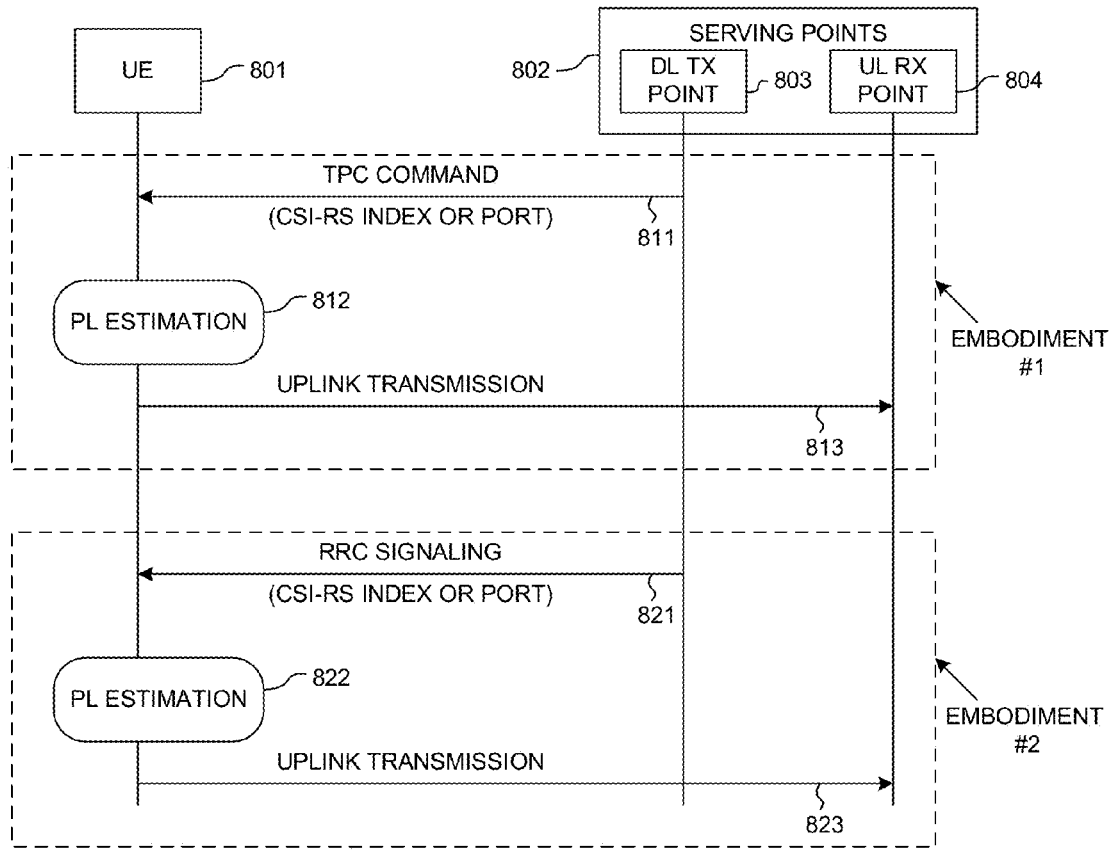
FIG. 8 illustrates one embodiment of uplink power control in CoMP deployment scenario 4.

FIG. 8 illustrates one embodiment of uplink power control in CoMP deployment scenario 4. In the example of FIG. 8, UE 801 has two serving points 802, which include one downlink control signaling point 803 and one uplink receiving point 804. In a first embodiment, downlink control signaling point 803 sends a transmit power control (TPC) command to UE 801 (step 811). The TPC command includes a CSI-RS index or CSI-RS port, which UE 801 can utilize for PL estimation. For example, the corresponding CSI-RS index used by uplink receiving point 804 is sent to UE 801 via the TPC command. As a result, UE 801 estimates the downlink pathloss based on the CSI-RS used by uplink receiving point 804 (step 812). The estimated pathloss is then used by UE 801 for uplink transmission to uplink receiving point 804 (step 813).

In a second embodiment, downlink control signaling point 803 sends an upper layer RRC signaling message to UE 801 (step 821). The RRC message includes a CSI-RS index or CSI-RS port, which UE 801 can utilize for pathloss estimation. For example, the corresponding CSI-RS index used by uplink receiving point 804 is sent to UE 801 via the RRC message. As a result, UE 801 estimates the downlink pathloss based on the CSI-RS used by uplink receiving point 804 (step 822). The estimated pathloss is then used by UE 801 for uplink transmission to uplink receiving point 804 (step 823).

Figure 9:
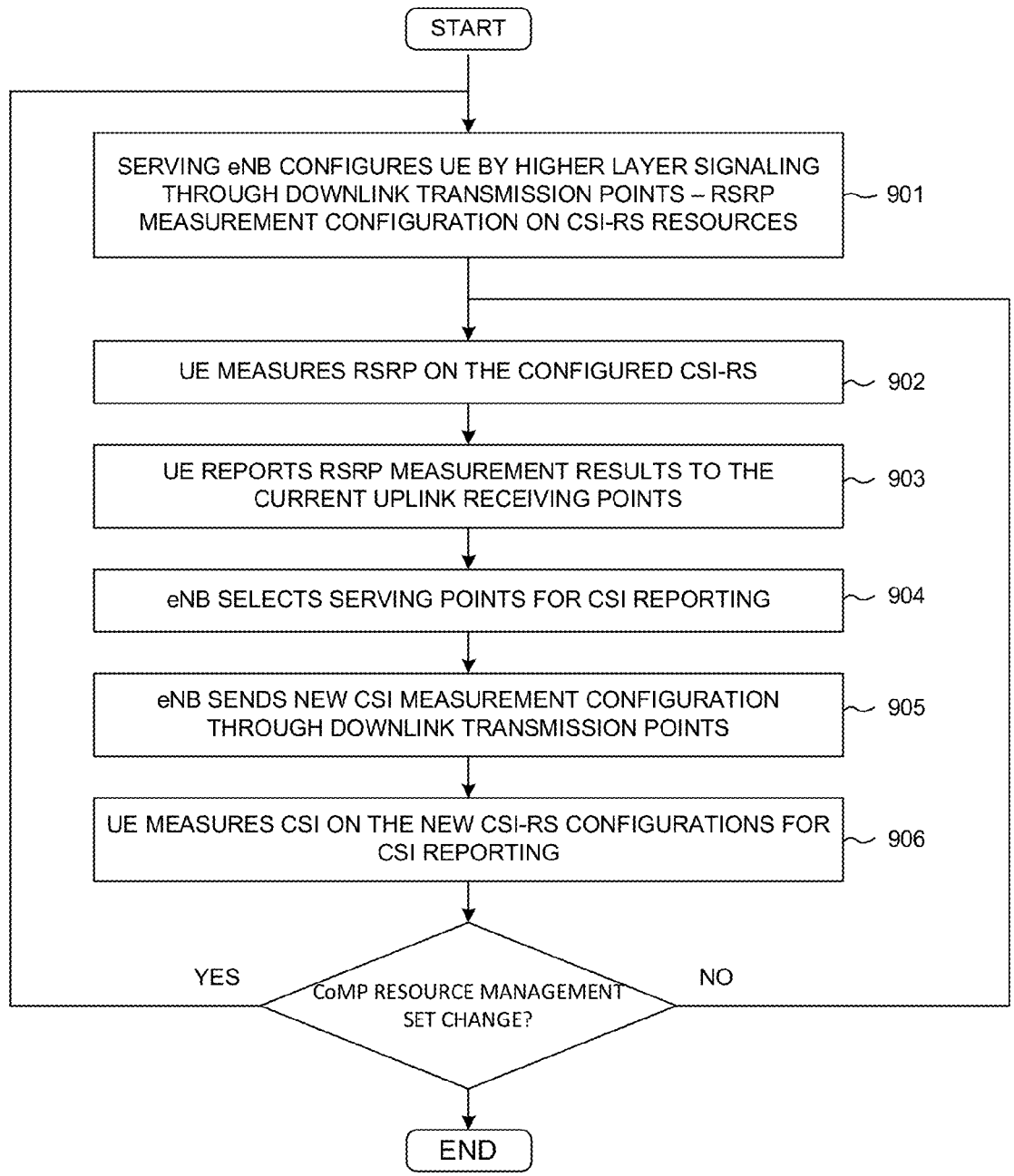
FIG. 9 is a flow chart of a method of measurement and feedback configuration from CoMP deployment scenario 4 in accordance with one novel aspect.

FIG. 9 is a flow chart of a method of measurement and feedback configuration from CoMP deployment scenario 4 in accordance with one novel aspect. In step 901, a serving base station macro-eNB configures a UE by higher layer signaling through downlink transmission points. The higher-layer configuration defines a CoMP resource management set to be used by the UE for serving point selection. The higher-layer configuration contains multiple Channel State Information Reference Signal (CSI-RS) configurations, and each CSI-RS configuration indicates a set of resource elements (REs) or subcarriers in both frequency domain and time domain as one CSI-RS resource with non-zero transmission power. In step 902, the UE measures Reference Signal Received Power (RSRP) of the multiple configured CSI-RS resources. The measurement result is the time average of several measurements on CSI-RS. In step 903, the UE reports the RSRP measurement results to the current uplink receiving points. The measurement reporting is an order list that determines the order of monitored CSI-RS configurations based on the received signal strength. In step 904, the serving macro-eNB selects serving points for CSI measurement and reporting based on the RSRP measurement results. In step 905, the serving eNB sends new CSI-RS configurations for CSI measurement and reporting through the current downlink transmission points. In step 906, the UE measures CSI on the new CSI-RS configurations for CSI feedback reporting. Finally, if the higher-layer configuration for CoMP resource management set is not changed, then steps 902-906 are repeated. On the other hand, if the higher-layer configuration for CoMP resource management set is changed, then steps 901-906 are repeated.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
receiving a higher-layer configuration for reference signal received power (RSRP) measurement from a downlink transmission point by a user equipment (UE) for serving point selection in a coordinated multi-point operating (CoMP) mobile network having a plurality of points, wherein the higher-layer configuration contains multiple Channel State Information Reference Signal (CSI-RS) configurations, and wherein each CSI-RS configuration indicates a set of resource elements (REs) or subcarriers in both frequency domain and time domain as one CSI-RS resource with non-zero transmission power;
identifying a CSI-RS configuration corresponding to a macro-eNB from the multiple CSI-RS configurations;
performing RSRP measurements based on the multiple CSI-RS configurations; and reporting RSRP measurement results to one or multiple uplink receiving points based on the RSRP measurements.

2. The method of claim 1, wherein the plurality of points shares the same physical cell ID, and wherein each CSI-RS resource is configured to be UE-specific and is independent from the physical cell ID.

3. The method of claim 1, wherein each CSI-RS resource contains a first number of subcarriers in frequency domain, a second number of OFDM symbols in time domain, and/or a code sequence.

4. The method of claim 1, wherein each CSI-RS resource is configured for a corresponding point using a number of antenna ports.

5. The method of claim 1, wherein the macro-eNB CSI-RS configuration is identified by an index in the high-layer configuration.

6. The method of claim 1, wherein the macro-eNB CSI-RS configuration is identified by a predefined CSI-RS configuration with non-zero transmission power.

7. The method of claim 1, wherein the plurality of points includes at least one remote radio head (RRH), and wherein a corresponding RSRP measurement result for the RRH is applied with a bias.

8. The method of claim 7, wherein the UE selects a subset of the measurement results for RSRP reporting after applying the bias.

9. A method, comprising:
receiving a first higher-layer configuration for reference signal received power (RSRP) measurement by a user equipment (UE) for CSI reporting in a cooperative multiple points (CoMP) mobile network having a plurality of serving points, wherein the first higher-layer configuration contains a first number multiple CSI Reference Signal (CSI-RS) configurations, and wherein each CSI-RS configuration indicates a set of resource elements (REs) or subcarriers in both frequency domain and time domain as on CSI-RS resource with non-zero transmission power;
performing CSI measurements based on the first number of multiple CSI-RS configurations;
reporting CSI measurement results to one or more uplink receiving points based on the CSI measurements; and
receiving a second higher-layer configuration for CSI measurement and reporting, wherein the second higher-layer configuration contains a second number of CSI-RS configurations with non-zero transmission power, and wherein the second number of CSI-RS configurations belongs to a subset of the first number of CSI-RS configurations.

10. The method of claim 9, wherein the CSI measurement results contain rank indicator (RI), channel quality indicator (CQI), and precoding matrix indicator (PMI) of the serving points.

11. The method of claim 9, wherein the serving points includes at least one downlink transmission point and one uplink receiving point.

12. The method of claim 11, wherein the downlink transmission point and the uplink receiving point are the same point.

13. The method of claim 11, wherein the downlink transmission point and the uplink receiving point are different points.

14. A method, comprising:
transmitting a first higher-layer configuration for reference signal received power (RSRP) measurement by a base station for serving point selection in a cooperative multiple points (CoMP) mobile network having a plurality of points, wherein the first higher-layer configuration contains a first number of Channel State Information Reference Signal (CSI-RS) configurations, and wherein each CSI-RS configuration indicates a set of resource elements (REs) or subcarriers in both frequency domain and time domain as one CSI-RS resource with non-zero transmission power;
receiving RSRP measurement results based on the first number of CSI-RS configurations;
selecting one or more serving points based on the RSRP measurement results; and
transmitting a second higher-layer configuration for CSI measurement and reporting, wherein the second higher-layer configuration contains a second number of CSI-RS configurations with non-zero transmission power for current serving points, and wherein the second number of CSI-RS configurations belongs to a subset of the first number of CSI-RS configurations.

15. The method of claim 14, wherein an index is used to indicate that a corresponding CSI-RS configuration is used by a macro base station.

16. The method of claim 14, wherein the plurality of points includes at least one remote radio head (RRH), and wherein the base station configures a bias for the RRH for range extension.

17. The method of claim 14, further comprising:
receiving CSI feedback based on the second number of CSI-RS configurations.

18. The method of claim 17, wherein the CSI measurement results contain rank indicator (RI), channel quality indicator (CQI), and precoding matrix indicator (PMI) of the serving points.

19. The method of claim 17, wherein the serving points includes at least one downlink transmission point and one uplink receiving point.

20. The method of claim 19, wherein the downlink transmission point and the uplink receiving point are either the same point or different points.

* * * * *